June 2, 1936.    J. EISNER ET AL    2,043,209
ADVERTISING DEVICE
Filed Sept. 17, 1935    2 Sheets-Sheet 1

INVENTORS
Jack Eisner
Samuel G. Hoffman
BY
ATTORNEYS

June 2, 1936. J. EISNER ET AL 2,043,209
ADVERTISING DEVICE
Filed Sept. 17, 1935   2 Sheets-Sheet 2

INVENTORS
Jack Eisner
Samuel G. Hoffman
BY Austin & Dix
ATTORNEYS

Patented June 2, 1936

2,043,209

UNITED STATES PATENT OFFICE 2,043,209

ADVERTISING DEVICE

Jack Eisner and Samuel G. Hoffman, New York, N. Y., assignors to Graphicut Displays, Inc., New York, N. Y., a corporation of New York Application September 17, 1935, Serial No. 40,961

2 Claims. (Cl. 40—126)

This invention relates to an improved advertising display device, and more particularly to a device of this type adapted for window display.

A large number of suggestions have been made in the past with a view to providing effective displays for windows. Most of these have been of the kind wherein the entire subject matter of the placard or the like lies in a single plane, so that they have lost a great deal of effectiveness on account of their flat appearance. On the other hand, suggestions for imparting depth or perspective to a display have involved complicated and expensive schemes for setting out figures or the like into the foreground, or have had other serious disadvantages. Now, it will be appreciated that the advertising art, involving as it does, the need for focusing the customer's attention and furnishing something new and interesting, demands for best results the frequent presentation of new copy. As is well known, the cost of presenting such advertising on a large scale is fabulous, and naturally the reduction of this cost to a minimum is of paramount importance. That is to say, advertising industry requires effective displays which are not too expensive and which can be made up easily and quickly in colors and through inexpensive manufacturing processes such as lithography or photolithography, or the like, and it is, therefore, an object to devise a poster or placard construction which can be simply and inexpensively made up by such processes, and at the same time produce a novel impression on those viewing it.

A feature of the present invention accordingly resides in the provision of an advertising display which satisfies the foregoing considerations in a superior manner.

More specifically, a feature of the present invention resides in the provision of an advertising placard construction in which a background supports in simple and convenient manner a number of portions of the display in such a manner that these portions stand out from the background in bulging or curved relation to the latter, and are formed of flexible yet shape-retaining material which may be laid out flat for lithographing or the like, and which can then be bent into curved shape and readily assembled with the background in order to build up a composite picture.

Another detailed feature of the present invention lies in providing an advertising display of the character mentioned which includes a number of such elements representing the features of a real or fictitious character formed on several separate flexible elements which are bent into curved or bulging form and which are adapted to be easily and conveniently assembled with other similar elements or with a background member, so that the various features may stand out not only from the background but also from other features.

Still another provision of the present invention resides in an advertising display of the character indicated in which a plurality of flexible elements having tabs at opposite edges thereof may be separately lithographed, printed or otherwise prepared while flat, and be subsequently assembled in convenient manner at the site of use by curving the various elements and inserting the tabs into appropriate slots in other similar elements or in a suitable stiff background member.

Other features, objects and advantages of the present invention will in part be pointed out and in part become apparent in connection with the accompanying drawings illustrating one form of device in accordance with the invention, wherein.

Figure 10:
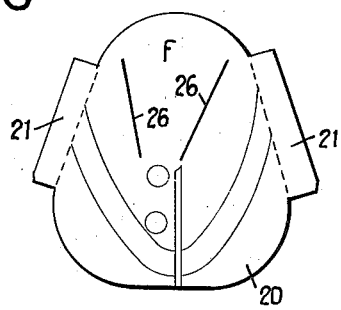
Figure 11:
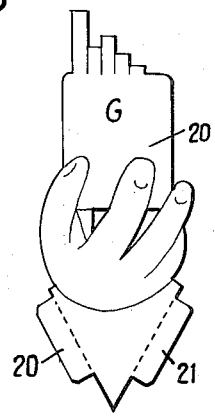
Figure 12:
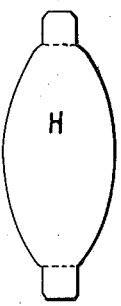

Figs. 5 to 12 inclusive are detailed views of portions of the display as they appear before assembly with the rest of the device.

Referring to the drawings, there is shown at 15 a panel which may be of any suitable shape, which forms the background for the rest of the display and which is preferably constructed of stiff cardboard or similar material having sufficient rigidity for the purposes hereafter indicated and being suitable for receiving a design or a picture of portions of a person's figure or other subject matter which can be lithographed or otherwise imposed upon the panel. Attached to the back of the panel 15 there may be provided a suitable wing 16 which serves to support the panel in a generally upright position, which may fold against the panel when not in use and which may be held in the position shown in Fig. 2 by means of any sort of arm 17 adapted to be swung out from the panel 15 within opening 18, as will be understood by those familiar with this field. It will be apparent that other types of supports may be employed for holding the panel in generally upright position.

Figure 1:
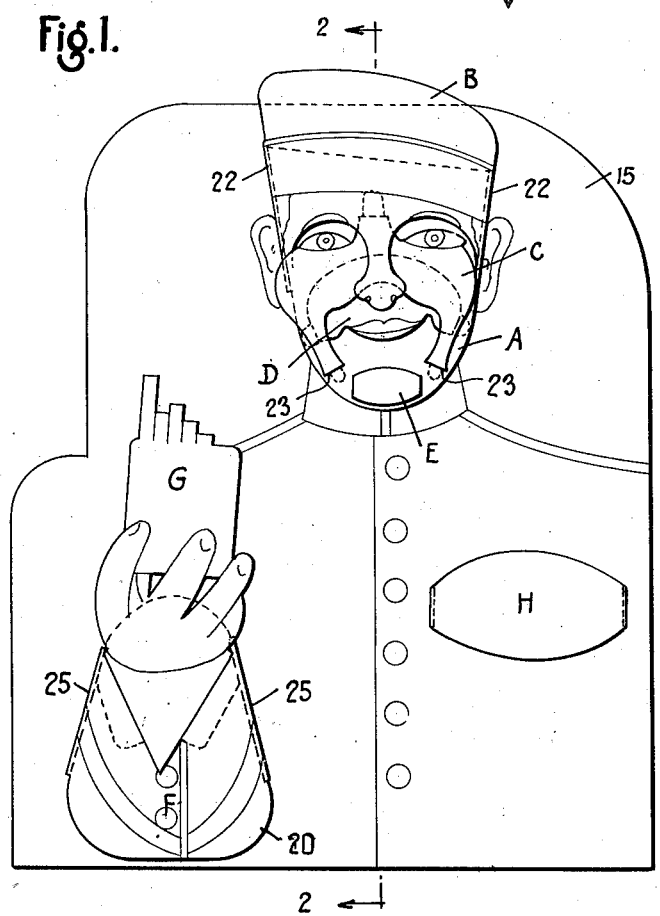
Fig. 1 is a front elevation of one form of a display device in accordance with the invention.
Figure 2:
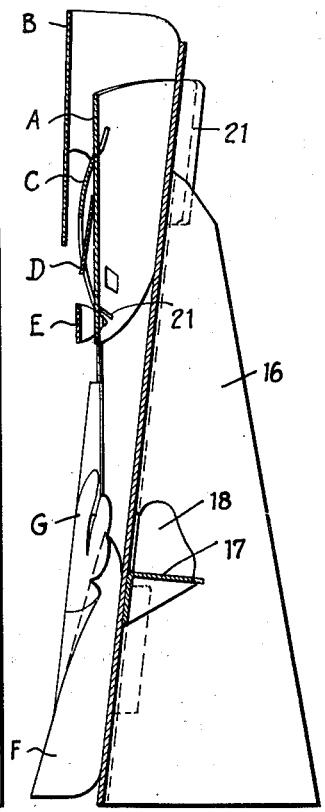
Fig. 2 is a vertical section taken on the line 2—2 of Fig. 1, looking in the direction of the arrows.
Figure 3:
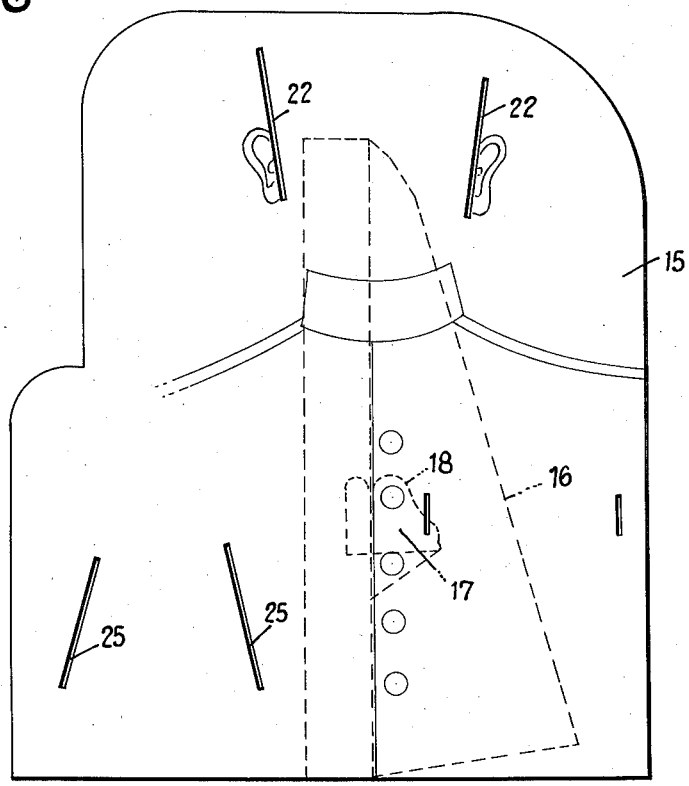
Fig. 3 is a front elevation of the device shown in Fig. 1 but with certain portions removed.
Figure 4:
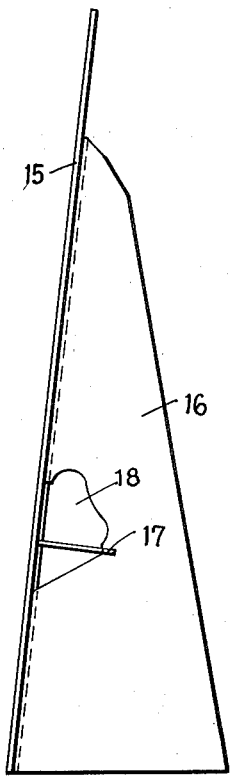
Fig. 4 is a side elevation taken from the right-hand side of Fig. 3.
Figure 5:
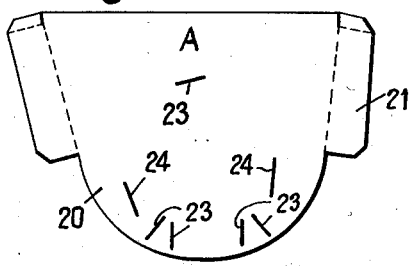
Figure 6:
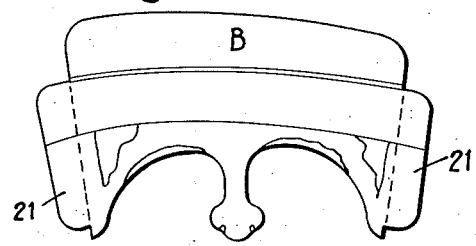
Figure 7:
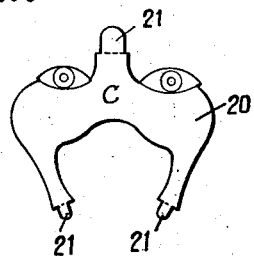
Figure 8:
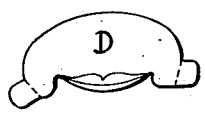
Figure 9:

In the preferred form of construction in accordance with the invention, a number of elements A to H inclusive are provided, each of which may have what will be termed a central portion 20 and two or more tabs 21 which in the various figures may be said to lie adjacent opposite sides or edges of the central portion 20. Each of these elements A to H is preferably formed of relatively thin paper or other light material which is capable of being spread out flat and which, when attached adjacent its opposite edges to the panel 15, with the edges moved relatively close together and with the central portions of these elements bulging out forwardly from the background, will be sufficiently stiff to retain a given or predetermined shape. When the element A is assembled with the panel 15, for example, by bending the tabs 21 rearwardly and inserting them into the slots 22 formed in the panel, the element A will be carried so that it bulges out as shown in Figs. 1 and 2, and, furthermore, so that it is capable of supporting other elements. Similarly, the tabs 21 on the elements C and D may be inserted respectively into slots 23 and 24, and these elements C and D will then also bulge out forwardly from the element A thus giving the features of the face a decidedly distinctive appearance. Moreover, the element B may have its tabs carried in the same slots 22 which receive the tabs of A, so that this element (which in the form illustrated by way of example includes part of the cap and nose of the figure) will bulge out in front of the elements A, C and D, as best shown in Figs. 1 and 2. Thus, two different portions of the construction, of different contour, may partially overlie one another and thus accentuate the impression of depth and distinctiveness, as is particularly important in the case of a caricature. Carried by the element A in the manner described, or in other convenient fashion, there may be any suitable number of other portions of the display such as element E, each bulging forward from the element on which it is supported.

Similarly, a hand or arm of a figure may be mounted on the panel 15 either directly or through an intermediate bulging element. For example, an element F of relatively thin, flexible, yet form-retaining paper, or the like, may be carried through tabs 21 in slots 25, and an element G, having tabs 21 at opposite sides of a central portion 20 may be attached to element F, for instance, through slots 26 in the latter, so that the element G is curved with its side edges near the background and its central portion furthest forward. If desired, G may support a real package.

It will be understood that as many or as few of the bulging elements may be employed as is desired, and that while the present manner of attaching them to the background or to one another is particularly simple and advantageous, the details of the construction may be varied considerably. When it is desired to balance the design, a suitable element H may be employed on the opposite side of the center of the background from the side at which elements already described are attached.

It will thus be appreciated that there is provided a simple advertising display device in which a relatively stiff background panel is employed in connection with a number of elements each of which can be lithographed or otherwise treated while flat and which can be then shipped flat to the point of use of the display before being assembled with the background. Moreover, each of the elements may be separately lithographed or printed or otherwise covered with a design in a separate operation so that different colors can be easily applied to different parts. Moreover, by employing the tabs as indicated, the elements may be formed as unitary pieces which can be easily stamped or cut out and quickly and simply assembled with the background panel. When the construction is assembled, it presents a particularly unusual, effective and attractive appearance since the various features representing, for instance, a real or fictitious person, may be brought out in a manner to give the impression of depth and also to enable each feature to be individually caricatured or emphasized, as desired. Moreover, the bulging or curved construction of the various elements is particularly effective since even when the display is viewed from either side at quite an angle the unlithographed or white rear surfaces of the elements are not seen. Furthermore, the device is particularly simple and inexpensive to manufacture, easy to ship and assemble, and susceptible of many different applications.

The terms and expressions which have been employed are used as terms of description and not of limitation, and there is no intention, in the use of such terms and expressions, of excluding any equivalents of the features shown and described, or portions thereof, but it is recognized that various modifications are possible within the scope of the invention claimed.

What we claim is:

1. In an advertising display device of the character described, a flat, rigid panel forming the background of the display and having portions of a complete design formed thereon, supporting means for said panel, a plurality of flexible paper elements having other portions of the design lithographed or similarly imposed thereon, said elements being sufficiently stiff to retain a curved shape when bent and supported at spaced points, at least one of said elements being mounted on said panel in curved relation thereto and other elements of different shape and contrasting color as compared to said first-named element being mounted at at least one point upon the first-named element and overlying part but less than the full width of said first-named element and extending forwardly and spaced from the latter, said overlying elements having outstanding tabs formed therewith and adapted to engage corresponding slots for receiving the tabs, whereby different expressive features may be carried with a background including complementary features, with the former features outstanding not only from the background but also from one another, and without the need for gluing or pasting at the site of use of the display device.

2. In an advertising device of the character described, a panel adapted to form the background of the display device and having portions of a complete design formed thereon, a relatively large element detachably mounted on said panel and bulging outwardly therefrom and having part of the complete design formed thereon, a cap element supported on said panel and overlying a part of said large element and having a nose projection downward, an eye and cheek element mounted on said large element and extending outwardly therefrom to give a contrast therewith and with said panel and being positioned partly beneath the nose portion of said cap element, an upper lip and additional cheek element mounted on said large element and extending outwardly therefrom and positioned relatively to said eye and cheek element to give a contrast thereto to thereby show depth, a small chin element mounted on the lower part of said large element and extending outwardly therefrom to give a contrast with said large element and with said cap element and with said eye and cheek element, a cuff element mounted on said panel beneath the level of the face, a hand and package element mounted on said cuff element and extending upwardly and outwardly therefrom, all of the said face elements overlying one another and extending outwardly from said panel to different distances, and all of the said elements mounted on said panel and on each other having a portion of the general design to be depicted by said display device and cooperating to accentuate the impression of depth and distinctness.

JACK EISNER.
SAMUEL G. HOFFMAN.